May 5, 1953
H. PHILLIPS
2,637,507
FISHING REEL
Filed Jan. 10, 1951
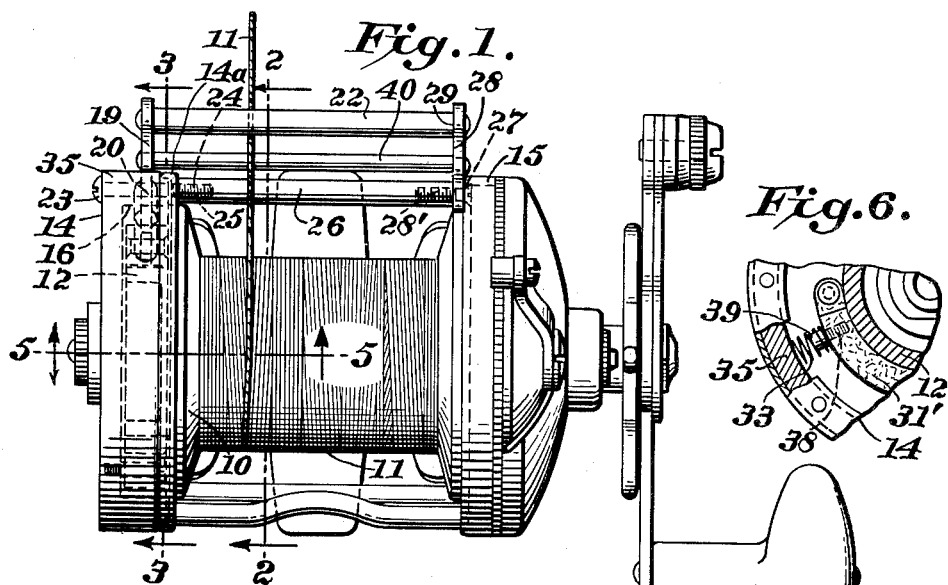
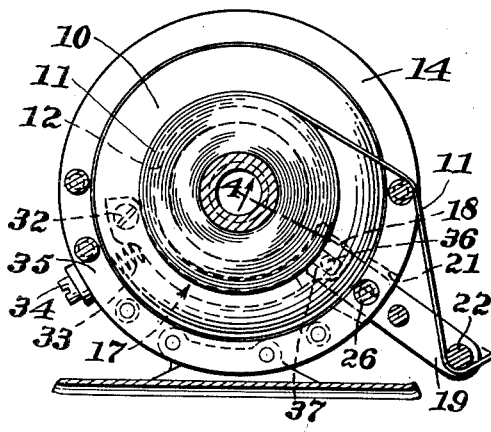
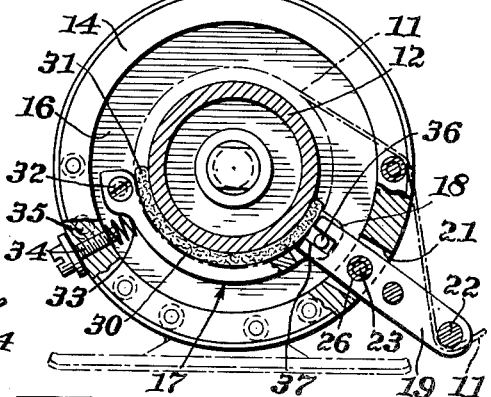
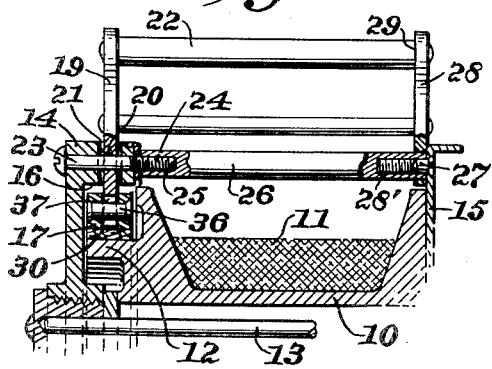
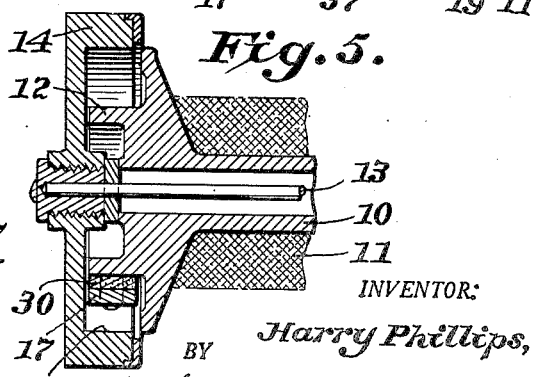
INVENTOR:
Harry Phillips,
BY Cushman, Darby & Cushman
ATTORNEYS.

Patented May 5, 1953

2,637,507

UNITED STATES PATENT OFFICE 2,637,507

FISHING REEL

Harry Phillips, Winston-Salem, N. C.

Application January 10, 1951, Serial No. 205,281

3 Claims. (Cl. 242—84.5)

The present invention relates to fishing reels and the primary object of the invention is to provide a reel with means to prevent "back-lash" in casting. Many devices have been suggested to overcome "back-lash," which is principally due to the fact that in casting, when the weighted end of the line reaches the water, overrunning of the line occurs on the reel, with consequent tangling, since there is nothing to retard the momentum of the reel.

The present invention, which is an improvement upon my application, Serial No. 149,420, filed March 13, 1950, now abandoned, provides a simple construction for eliminating "back-lash" and also affords a rigid device which is not deteriorated by use or by exposure to weather.

The present invention may be incorporated in reels of conventional structure without substantial modification of the same and may be embodied in an entirely new reel structure.

Referring to the drawings:

Figure 1 is a plan view;

Figure 2 is a central vertical section on the line 2—2 of Figure 1;

Figure 3 is a central vertical section on the line 3—3 of Figure 1;

Figure 4 is a detail sectional view on the line 4—4 of Figure 2;

Figure 5 is a fragmentary vertical sectional view, and

Figure 6 is a fragmentary section of a modified form of the invention.

The invention may be embodied with all types of conventional reel structures of which an example is illustrated in Figure 1. Such reels comprise a winding drum 10 upon which the line 11 is coiled, as shown. The drum, at one end thereof, as shown in Figure 5, is provided with an integral extension 12 which is circular and hollow. The outer cylindrical surface of this extension 12, as shown in Figures 2, 3 and 4, constitutes a brake drum, as will be later described. The drum is mounted for rotation, as usual, on a suitable shaft or stem 13, which engages in suitable openings in the frame members 14 and 15 on opposite sides of the reel, as shown in detail in Figure 5. In the present instance, the frame member 14 is connected as by screws to the conventional frame member 14a of the reel, but this latter may be omitted and the frame member 14 used alone.

Mounted in the inwardly opening recess 16 in the frame member 14 is an arcuate brake shoe 17, as shown in Figures 3 and 5, the brake shoe being pivotally and slidably connected at one end, as at 18, to a lever 19, which is pivotally connected at 20 in a peripheral slot 21 of the member 14, as shown in Figure 3.

At its outer end, the lever 19 is rigidly connected to a bar 22, as shown in Figure 1, which extends across the reel.

Referring to Figure 4, the pivotal connection 20 for the lever 19 may be of any suitable form, but preferably includes the screw 23, having its threaded end 24 received in the threaded opening 25 in the fixed guide bar 26. At its opposite end, the guide bar 26 is held in position by the engagement of a countersunk screw 27 engaging in the threaded opening 28' of the bar. The bar 26, at this opposite end, forms a pivotal mounting for a lever 28 which carries the other end of the bar 22, as shown at 29. It will be observed at this point that the bar 22 is a fishing line engaging bar, being pivotally mounted upon the bar 26 at one end and the screw 23 at the opposite end by the lever 19 which has its inner end pivotally connected to the brake shoe, as shown at 18.

Referring to Figure 3, the brake shoe 17 is arcuately formed, being provided with a metal or fibre backing 30 and a braking liner 31, suitably adhered to the inner surface of the shoe. At one end, the brake shoe is pivotally mounted by means of the screw 32 which has its threaded end engaged in the inner wall of the frame member 14. Bearing upon the outer surface of the shoe 17, adjacent its pivotal connection 32, is a coil spring 33 which is held in place and suitably guided by the screw 34 mounted in the flange portion 35 of the frame member 14. This construction always maintains the brake shoe with its brake lining in engagement with the brake drum 12, unless a force is exerted greater than the pressure of the spring 33. At its opposite end, the brake shoe 17 has a laterally extending pin or projection 36 which engages in the slotted end 37 of the lever 19, whereby the lever has both a pivotal and sliding engagement with the pin 36.

Referring to Figure 6, the retaining guide screw 34 is omitted and the spring 33 is retained in position by a screw 38 having an enlarged head 39 and the inner wall surface of the flange 35 of the frame member 14.

While in Figure 3, I have illustrated a brake shoe having the lining 31, other types of braking elements may be used, as illustrated in Figure 6, where a brake liner composition is utilized alone and the brake shoe backing 30 is omitted.

In the operation of the invention, as when a fisherman is casting, the pressure of the fishing line as it feeds out causes the bar 22 to rotate and rotation of the bar 22 moves the lever 19, which, being pivoted upon the screw 23, draws the brake shoe outwardly against the action of the spring 33 and away from engagement with the brake drum 12, whereby the reel and the fishing line thereon will be free running. When, however, the sinker and bait strike the water, the tension is relieved, and the spring 33 instantaneously moves the brake shoe into engagement with the drum 12, thereby to avoid overrunning of the line on the reel and back-lash of the line. This is accomplished because the release of tension, occasioned by the sinker and bait striking the water, permits the spring to instantly exert its full pressure to apply the braking action, due to the lack of tension on the line.

Referring to Figure 1, a bracing or reinforcing bar 40 is connected at one end to the lever 19 and at its other end to the lever 28.

The bar 22 constitutes the fishing line engaging member for operating the brake, being mounted for rotating movement by reason of its support upon the lever 19 and the lever 28 which, as explained, are pivotally mounted.

The use of both a sliding and pivotal connection 36—37 between the lever 19 and the brake shoe 17 has been found highly effective in use and not only reduces wear and compensates for wear, but meets the requirements of a fisherman for a foolproof device which can be relied upon to act instantly for preventing back-lash.

I claim:

1. A fishing reel comprising: spool supporting frame members; a one piece spool having an integral circular brake drum extension at one end; the first of said frame members having an inwardly facing brake drum enclosing flange, the second of said frame members having an outwardly facing gear train encasing flange; an arcuate brake shoe having one end pivotally mounted on said first frame member and within the enclosure of said brake drum enclosing flange; a coil spring in compressed engagement between said brake shoe and said brake drum enclosing frame and disposed radially with respect to the said spool, said spring having one end engaging said brake drum enclosing flange and the other end engaging said brake shoe; a first lever pivotally mounted on said first frame member and pivotally and slidably connected with the free end of said brake shoe by means of a laterally extending pin in the end of the brake shoe and a pin receiving yoke at the brake shoe engaging end of said lever, said lever extending radially substantially beyond the confines of said frame members; a second lever pivotally mounted on said second frame member extending radially and substantially beyond the confines of said frame members, said second lever being parallel to said first lever; and a fish line engaging bar mounted transversely between said levers in a position to be engaged by a line leaving the spool so as to actuate said levers to disengage said brake shoe from said brake drum.

2. A fishing reel of the type described in claim 1 wherein said coil spring is positioned by a radially disposed screw extending inwardly through said brake drum enclosing flange.

3. A fishing reel of the type described in claim 1 wherein said coil spring is positioned by a radially disposed screw projecting outwardly from said brake shoe.

HARRY PHILLIPS.

References Cited in the file of this patent

UNITED STATES PATENTS

| Number | Name | Date |
|---|---|---|
| 496,654 | Heskett | May 2, 1893 |

FOREIGN PATENTS

| Number | Country | Date |
|---|---|---|
| 25,100 of 1904 | Great Britain | Sept. 28, 1905 |
| 44,666 | France | Mar. 20, 1935 |
| | Addition to No. 773,025 | |
| 38,168 | France | Apr. 20, 1931 |
| | Addition to No. 579,018 | |